Feb. 14, 1928.
A. A. KLEMS
1,659,204
GREASE GUN
Filed July 26, 1920   2 Sheets-Sheet 2
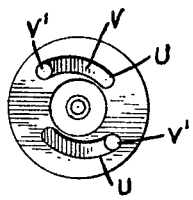
*Fig. 4*
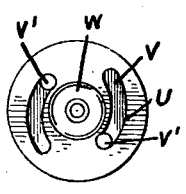
*Fig. 5*
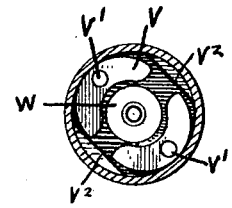
*Fig. 6*
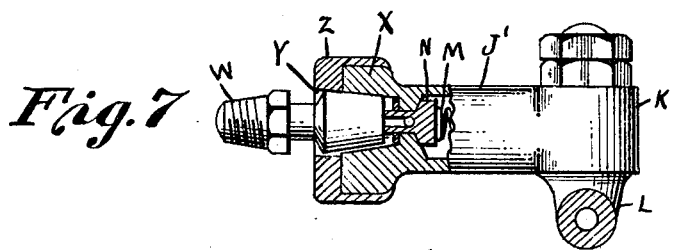
*Fig. 7*
*Fig. 8*
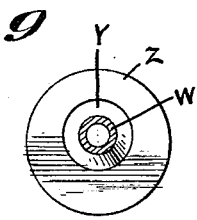
*Fig. 9*
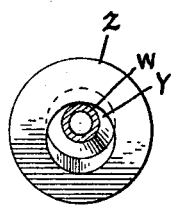
*Fig. 10*
Inventor
Albert A. Klems
By William M. Swan
Attorney Patented Feb. 14, 1928.

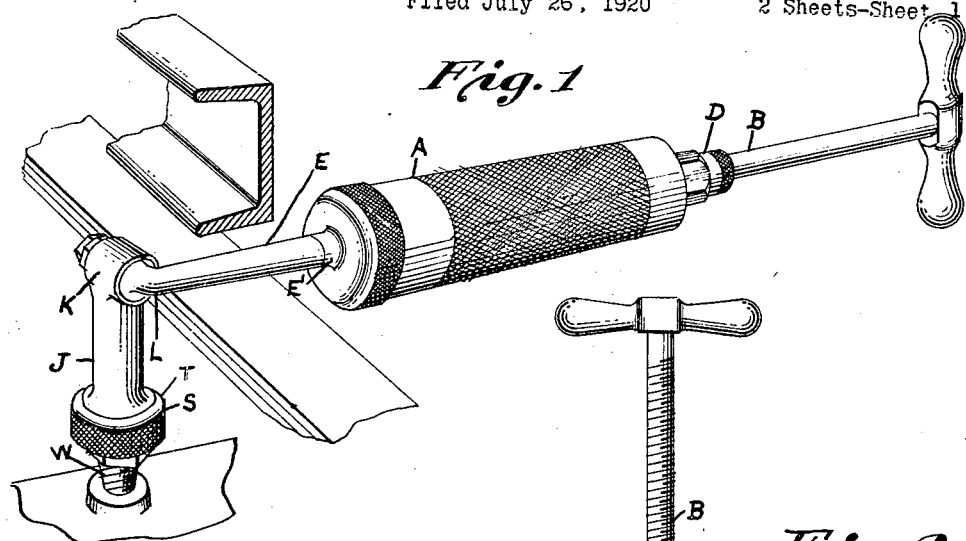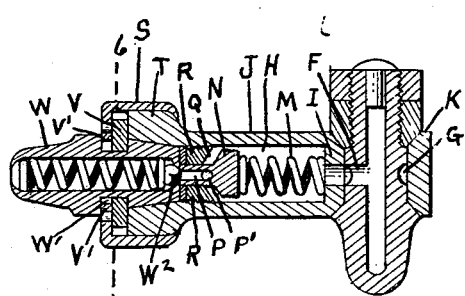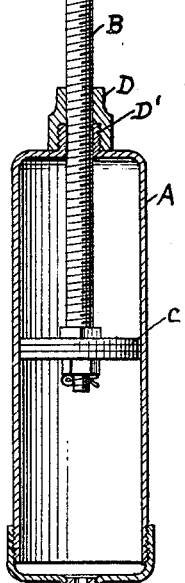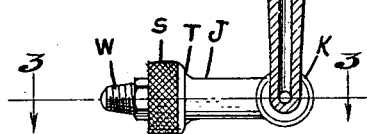

1,659,204

UNITED STATES PATENT OFFICE.

ALBERT A. KLEMS, OF DETROIT, MICHIGAN, ASSIGNOR TO FORD W. HARRIS, OF LOS ANGELES, CALIFORNIA.

GREASE GUN.

Application filed July 26, 1920. Serial No. 398,946.

This invention relates to what are commonly spoken of as "grease guns", and has for its object an improved organization of parts by means of which a relatively heavy lubricant of low viscosity may be forced into the bearings of machines, vehicle wheels and the like, with a far greater pressure than is now possible, when reliance is placed upon an apparatus involving, among other elements, a hose member, even when metally reinforced, the ordinary bayonet slot connection between the terminal of the apparatus and the outer end of the grease nipple or cup etc.

In the drawings:

Figure 1 is a perspective of my improved device, showing how it can be most conveniently used around the projecting edge or corner of some structural part that would ordinarily interfere with convenient access to the grease cup.

Figure 2 is a partly sectional elevation.

Figure 3 is an enlarged sectional detail, taken along the line 3—3 of Figure 2, showing my device in position relatively to the adjacent end of a grease cup, the outlet valve being forced thereby into open position.

Figure 4 is an end elevational view of the clamping cap on the end of the extension pipe of the "grease gun."

Figure 5 is a similar view to Figure 4, showing the outlines of the grease cup in the center and enclosed by the cap piece of Figure 4, before being turned relatively thereto, to effect clamping action.

Figure 6 is a sectional view taken along the line 6—6 of Figure 3, showing the key pieces which cooperate with the slots in the cap to effect the locking action on the grease cup or nipple.

Figure 7 is a partly sectional and partly elevational view of a slightly modified form of terminal clamping cap in position about a grease cup or nipple.

Figure 8 is a similar view with the grease cup or nipple forced into seating position and clamped, the end of the cap being thinner than in Figure 7.

Figure 9 is an end elevational view of the position of the parts as shown in Figure 7.

Figure 10 is a similar end elevation, the cap being of the modified type shown in Figure 8 and engaging partly over the tapered shoulder of the grease cup.

A represents the barrel or casing of the device, through the upper end of which the piston stem B, carrying the piston C, is movable, the stem B having a screw-threaded engagement through the stuffing box D, which in turn is adapted to be screwed to the centrally apertured projection D′ on the end of the shell or casing A. The first section E of the extension pipe is detachably secured, as by screw threading, to the apertured projection E′ on the opposite end of the shell from that through which the stem B engages, so that when the extension pipe E is detached from the shell, and the stuffing box D is unscrewed from its anchorage D′, the threaded projection E′ may be lowered into a supply of heavy oil; the piston C having meantime been slid to the lower end of the shell A, a strong and continued upward draw upon the stem B will result in filling the shell A with the desired supply of heavy lubricant. The extension pipe E is then screwed onto the projection E′, and the stuffing box D screwed to its seat about the threaded exension D′, thus preventing further movement of the stem B and its piston C toward the outlet end E′ of the casing, except as the handle of the stem B is turned to effect the gradual though powerful advance of the piston C toward the outlet end E′ of the casing, driving the lubricant before it through the extension pipe E and its connected parts.

The outer end of the extension pipe E is bent or elbowed as at L, and this latter portion is provided with a lateral outlet hole F, which lies in the line of the groove G, so that whatever lubricant is forced out through the extension pipe E, can emerge through the hole F and the groove G into the central aperture H of the barrel piece J, whose inner end portion K slidably engages about the grooved portion of the elbow section L. In the outer end of the barrel piece J is located a helical spring M, the inner end of which rests upon the centrally apertured cross wall I, while its outer end, pressing against the valve piece N, serves to yieldingly hold it in place in its seat Q. so that its central bore P and the lateral extension thereof P′ are blanked by the surrounding nut R from the access thereto and therethrough of the grease that has been forced through the extension pipe E and the barrel piece J and past the head of the valve N.

The outer end of the barrel piece J is enlarged, as at T, to permit the engagement thereover of the cap S, whose edges engage under the enlargement T in a way to hold the cap S in position thereon, while permitting its rotative movement relatively to the enlargement T. The end portion of the cap S is slotted, as at U, for the engagement therethrough of the projecting pins V' of the key pieces V, which are interposed between the end of the enlargement T and the adjacent inner surface of the cap S. These slots being cut of different radii from that of the cap S and of the key pieces V, whenever the cap S is turned, the guide studs V' engaging through the slots U, cause the movement of the key pieces V against the adjacent sides of a grease cup or nipple W, which has been inserted through the central aperture W' in the cap S, thereby locking it in position within the barrel piece. The limiting edges V² of the enlarged part T serve to guide the key pieces inwardly and against the sides of the inserted grease nipple as the key pieces are actuated by the turning of the cap S. The forcing of the grease cup to its seat, illustrated particularly in Figure 3, has served to bring its end against the end of the yieldingly projected valve piece N within the barrel J, thus forcing it to the open position shown, and consequently making it possible for the lubricant to pass by the head of the valve N, through the oil passages P' and P therein, and against the spring-held ball piece W², which closes the exposed outer end of the centrally bored grease cup W, into which it is desired that the lubricant be forced. So long as the cap is in such eccentric locking position relatively to the enlarged end T of the barrel, thus preventing the detachment of the barrel and its connected extension pipe and cylinder from the exposed end of the grease cup, there is thus constituted a continuous channel for the forced flow of the lubricant from the interior of the cylinder A, to the grease cup W, at no point in which is there a weak link or section such as would be constituted by the hose or flexible piping now generally relied upon to afford access to parts relatively inconveniently located. A high degree of forcing power is derivable from the screw-threaded projection of the stem B and its piston C, though this is regulatable both as to time of action and quantity of lubricant projected according to the circumstances of each case.

In the form of engagement terminal and of its cap on the barrel piece shown in Figures 3 to 6 inclusive, reliance is placed upon the clamping action of the key pieces just described, the grease cup aperture in the cap S being concentrically located with respect to the cap S, as well as to the common central axis of the barrel J and grease cup or nipple W. In Figures 7 to 10 however, I have illustrated a slightly modified form, from which the key pieces V are omitted. In place thereof, I rely upon the positioning of the grease cup aperture in the extension head X slightly to one side of the central axis of the barrel J' and position the aperture Y in the cap Z accordingly; this position is shown in Figures 7 and 9. When the grease cup is forced as far within the head X as possible, thereby unseating the valve N, the cap Z is now turned about the head X until its aperture Y is no longer concentric with the axis of the grease cup, and one edge of the aperture in the cap engages against the tapered neck and shoulder portion of the now seated grease cup or nipple in a way to hold it both against escape and in seating position relatively to the valve N. This is shown in Figures 8 and 10. When the proper amount of lubricant has been forced into the grease cup by action of the stem B and piston C within the shell A, the cap Z may be rotated in the opposite direction into its aperture Y, in alignment with the sides of the grease cup, as shown in Figures 7 and 9 and the barrel end may then be removed from the exposed end of the grease cup, thereby enabling the seating of the valve N once more under action of its spring M.

What I claim is:

1. In a grease gun adapted to supply lubricant to a tapering grease nipple, the combination of: grease ejecting means; a mouthpiece provided upon said means, there being a tapered seat provided in said mouthpiece adapted to fit said nipple; and a bonnet eccentrically rotatable upon said mouthpiece, there being an opening eccentrically formed in said bonnet through which said nipple is adapted to extend to engage said seat, said bonnet being manually rotatable to lock said nipple against said seat.

2. In a grease gun adapted to supply lubricant to a grease nipple, the combination of: grease ejecting means; a mouthpiece provided upon said means, there being a seat provided in said mouthpiece adapted to fit said nipple; and a bonnet eccentrically rotatable upon said mouthpiece, there being an opening eccentrically formed in said bonnet through which said nipple is adapted to extend to engage said seat, said bonnet being manually rotatable to lock said nipple against said seat.

In testimony whereof, I sign this specification.

ALBERT A. KLEMS.